United States Patent [19]

Bezin et al.

[11] Patent Number: 5,039,470
[45] Date of Patent: Aug. 13, 1991

[54] METHOD OF MANUFACTURING A BICYCLE FORK

[75] Inventors: Michel Bezin, Nevers, France; Joris V. Raemdonck, Bazel, Belgium

[73] Assignee: Look S.A., Nevers Cedex, France

[21] Appl. No.: 384,343

[22] Filed: Jul. 24, 1989

[30] Foreign Application Priority Data

Jul. 25, 1988 [DE] Fed. Rep. of Germany ....... 3825245

[51] Int. Cl.$^5$ .................... B29C 43/18; B29C 43/20
[52] U.S. Cl. ................. 264/255; 264/258; 280/279; 280/288.1; 280/280
[58] Field of Search .............. 264/257, 258, 255, 250; 280/281.1, 280.1, 279, 288.1

[56] References Cited

U.S. PATENT DOCUMENTS

| | | | |
|---|---|---|---|
| 4,650,620 | 3/1987 | Owen | 264/46.7 |
| 4,657,795 | 4/1987 | Foret | 428/36 |
| 4,828,781 | 5/1989 | Duplessis | 264/250 |

FOREIGN PATENT DOCUMENTS 0230839 8/1987 France .

*Primary Examiner*—Jay H. Woo
*Assistant Examiner*—Jeremiah F. Durkin, II
*Attorney, Agent, or Firm*—Townsend and Townsend

[57] ABSTRACT

A method of manufacturing a bicycle fork including forming a manufactured blank comprising a metallic steering spigot 11, two fork arms 13 and a pair of metallic axle mounts 14. Each fork arm 13 includes a hard foam core 19 at the lower straight portion of each fork arm 13 and a flexible foam core 22 at the upper end of each fork arm 13. Alternatively, a single flexible foam core having an internal pressurization may be advantageously used. The axle mounts 14 have a connection spigot 21 which is inserted into the free ends of each fork arm 13. A polymer impregnated flexible foam sheath 20 is laid around foam core 19, flexible foam core 22 or 37 and connection spigots 21. Subsequently, various polymer impregnated fiber reinforced sleeves 15, 16, 17, 18 are laid around the foam sleeve 20. The upper parts of the fork arms 13 are brought together to form a fork head 12 having a single steering spigot connection part 12a and fork arm transition parts 12b. Connection part 12a is introduced at least substantially into the lower end of the steering spigot 11. A pressure piston is inserted into the blank and, in a heatable mold, the blank is molded into its final shape upon application of bot heat and pressure, and then cured.

18 Claims, 5 Drawing Sheets

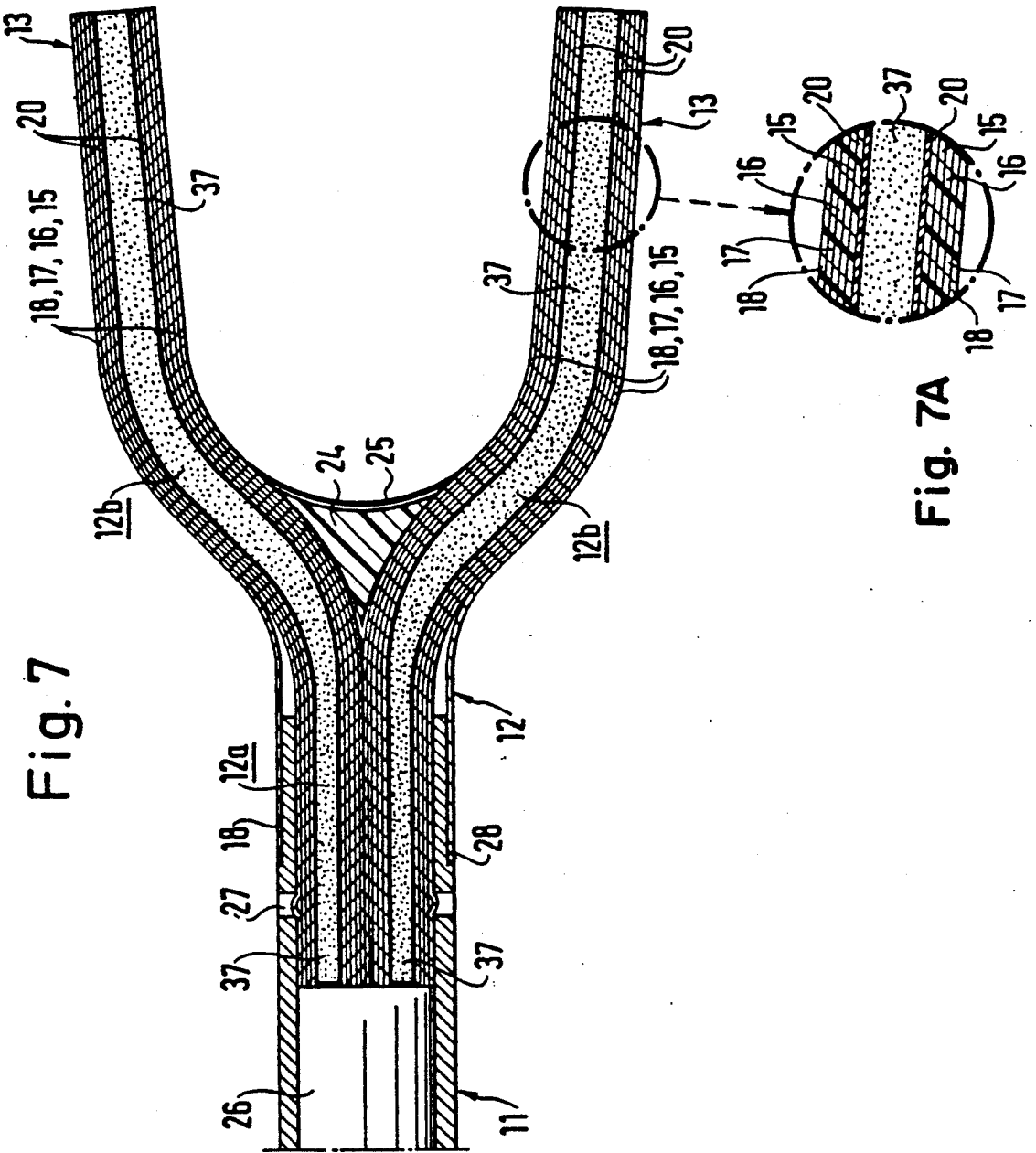

METHOD OF MANUFACTURING A BICYCLE FORK

BACKGROUND OF THE INVENTION

The invention relates to a method of manufacturing a bicycle fork comprising a tubular steering spigot of metal, in particular of steel, a fork head consisting of fiber reinforced plastic and rotationally fixedly connected to the steering spigot, two fork arms which are formed in one piece with the fork head and which likewise comprise fiber reinforced plastic, and connection spigots of axle mounts of metal, in particular of steel, which are inserted in rotationally fixed manner into the free end of each of the fork arms, wherein the fork head and the fork arms have a plurality of sheaths of polymer impregnated fiber bundles which are laid around their axes and which consist either of only one group of fibers which extend parallel to one another and to the axis, or of two groups of fibers which extend parallel to one another and which can be arranged at an angle of up to 90° to one another. Furthermore the invention relates to a bicycle fork made in accordance with this method.

It is already known from EP-A 0 127 553 to manufacture the tubes of a bicycle frame of sheaths or layers which are concentric to one another and which consist of polymer impregnated fiber arrangements. The fiber arrangements can be of differing construction in the individual sheaths and both sheaths with fibers extending parallel to the axis and to one another and also sheaths with fiber meshes and/or fiber fabrics can be provided. After the individual sheaths have been wound on top of one another the blanks are heated in suitable molds whereby the plastic impregnation first becomes liquid and then flows together with the plastic impregnations of the adjacent sheaths and subsequently hardens. The customary hardening temperatures lie around 20° to 160° C.

It has already become known (EP-A 0 230 839) to manufacture the fork head and the fork arms of bicycle forks of synthetic resin reinforced by textile material. The textile material which serves for the reinforcement consists at least partially of weaves arranged above one another and comprising fibers which extend in two different directions, with filaments or fibers which extend in the longitudinal direction being arranged between these weaves. The manufacture of the known bicycle fork proceeds in such a way that the fork head and the fork arms of resin reinforced with textile material are first manufactured in their final form including hardening and that the tubular steering spigot of metal and also the axle mounts are subsequently applied to the basic body of plastic. A firm bond between the metal and plastic parts which takes account of all possible loadings is however not achievable with the known method, or only with a high degree of complexity and expense so far as the assembly is concerned. As the receiving bores in the steering spigot and also in the lower ends of the fork arms generally have a circular cross-section the rotational securing of the metal and plastic parts relative to one another is in particular problematic.

SUMMARY OF THE INVENTION

The object underlying the present invention is thus to provide a method of the initially named kind, and a bicycle fork manufactured in accordance with this method, in which the metal parts and the fiber reinforced plastic parts can be bonded together in simple and uncomplicated manner without the separation of the mutually bonded parts having to be feared in later use. The invention thus seeks to provide a bicycle fork comprising metal and fiber reinforced plastic parts, with the fork, although manufactured of quite different materials, practically having the characteristics, i.e. in particular the strength and the resistance, but not however the weight, of a customary one-piece metal fork.

In order to satisfy this object, the method of the present invention is characterized in that the connection spigots are each extended by a molding core which is later arranged in the respective fork arm and in the fork head and which is flexible at least in the region of the fork head, with the molding core extending up to the upper end of the fork head; in that a plastic impregnated flexible foam sheath is laid around the connection spigots and the molding core; in that the various fiber reinforced sheaths are subsequently laid around the foam sheath; in that the upper part of the fork head containing the flexible foam core is combined into a single steering spigot connection part and is inserted at least substantially in a mating fit into the lower end of the steering spigot; and in that the blank prepared in this way is brought into the final bicycle fork shape in a heatable mold corresponding to the desired bicycle fork shape, whereupon the mold is brought to the temperature required for the liquifaction and subsequent hardening of the plastic impregnations and is kept at this temperature until the plastic impregnations have hardened, whereupon the bicycle fork is removed from the mold.

The concept underlying the invention is thus to be seen in the fact that the liquifaction and hardening of the plastic impregnation of the sheaths forming the fork arms and the fork head first takes place after the connection to the tubular metal steering spigot and to the metal connection spigots of the axle mounts has been produced. As the final hardening takes place under pressure in a mold, preferably using a press piston, then a truly intimate connection is realized between the metal and the plastic parts. Thus a bicycle fork arises as a whole in a composite construction which is indeed superior to a one-piece bicycle fork of metal with regard to its strength and resistance but which nevertheless has a substantially reduced weight.

An important feature of the present invention is the elongate mold core used during manufacture which must be sufficiently flexible in order to be matched within the mold without problem to the shape of the fork arms and of the fork head, but which should nevertheless be sufficiently stiff relative to external pressure that the individual sheaths laid around the core can be applied without problem and can assume and retain the shape set by the outer shape of the core until hardenend.

In the construction of the molding cores, it is only the part which is located in the region of the fork head which is formed of flexible plastic whereas hard foam cores are arranged in the generally straight fork arms.

It is however also possible to form the molding core by a core hose, which is sealingly closed at both ends and stands under internal pressure. Escape of the internal pressure after completion of the bicycle fork is not disadvantageous since all tension, pressure, bending and torsional forces which occur in later use are born exclusively by the various sheaths.

A particularly preferred embodiment is characterized in that a plastic impregnated flexible foam material crutch piece is inserted into the crutch where the two fork arms run together, with the crutch piece being covered by a fiber reinforced saddle-like crutch sheath or cover which is preferably applied at its margins which terminate at the fork arms and at the fork head respectively onto the outermost sheath of the fork arms. This embodiment achieves a special reinforcement of the bicycle fork in the crutch region where the two fork arms merge into the fork head and this reinforcement protects in particular against spreading of the fork arms.

A particular intimate bond between the steering spigot and the fork head is achieved when the upper end of the outermost sheath is laid from the outside around the lower end region of the steering spigot, in particular when the steering spigot has a recess in the relevant lower end region at the outside for receiving the outer sheath, since the lower end region of the steering spigot is hereby molded into the plastic of the fork head both at its inner side and also at its outer side.

The intimacy of the bond, and in particular a problem-free rotationally fixed connection between the steering spigot and the fork head which withstands even heavy loadings, is ensured by an arrangement in which the steering spigot has preferably through-going bores in the lower region which are distributed around the circumference and the sheaths are pressed at least partially into the bores prior to or during the heating.

A particularly preferred further constructional development of this embodiment is characterized in that the bores are provided as a ring of bores concentric to the axis of the steering spigot above the region where the outermost sheaths are drawn at the outside over the steering spigot. A particularly advantageous feature of this embodiment is the fact that the plastic and in part also the sheath-like fiber arrangements are pressed into or move into the anchoring bores during the pressing process in the mold or through the action of the press piston.

Through the invention there is thus provided a bicycle fork which behaves in practice in the same manner as a one-piece bicycle fork and which comprises a tubular steering spigot of metal, axle mounts of metal and having connection spigots, a fork head and also fork arms which are manufactured from fiber reinforced plastic impregnated sheaths and a molding core, characterized in that the fork arms and the fork head are molded around the connection spigots of the axle mounts and into the steering spigot respectively and preferably have at least one outer sheath molded around the lower end region of the steering spigot, and are first cured there after being molded in and around the respective parts; in that the connection spigots of the axle mounts preferably have circumferential ribs and expediently a tapered rounded tip facing the fork arm; and in that, in particular, the connection spigots have a non-round cross-section.

While the ribs are expedient for the problem-free transmission of weight forces and jolt forces the non-round cross-section of the connection spigots serves to effectively avoid rotational movements of the axle mounts relative to the fork arms about the axis of the fork arms.

Between the connection spigots and the parts of the axle mounts which project downwardly out of the fork arms there is preferably provided a radially outwardly broadened step which likewise serves for good support of the axle mounts on the fork arms.

BRIEF DESCRIPTION OF THE DRAWINGS

The invention will now be described in the following by way of example and with reference to the drawing in which are shown:

FIG. 7A is an expanded view of a portion of the bicycle fork.

DETAILED DESCRIPTION OF A PREFERRED EMBODIMENT

Figure 1:
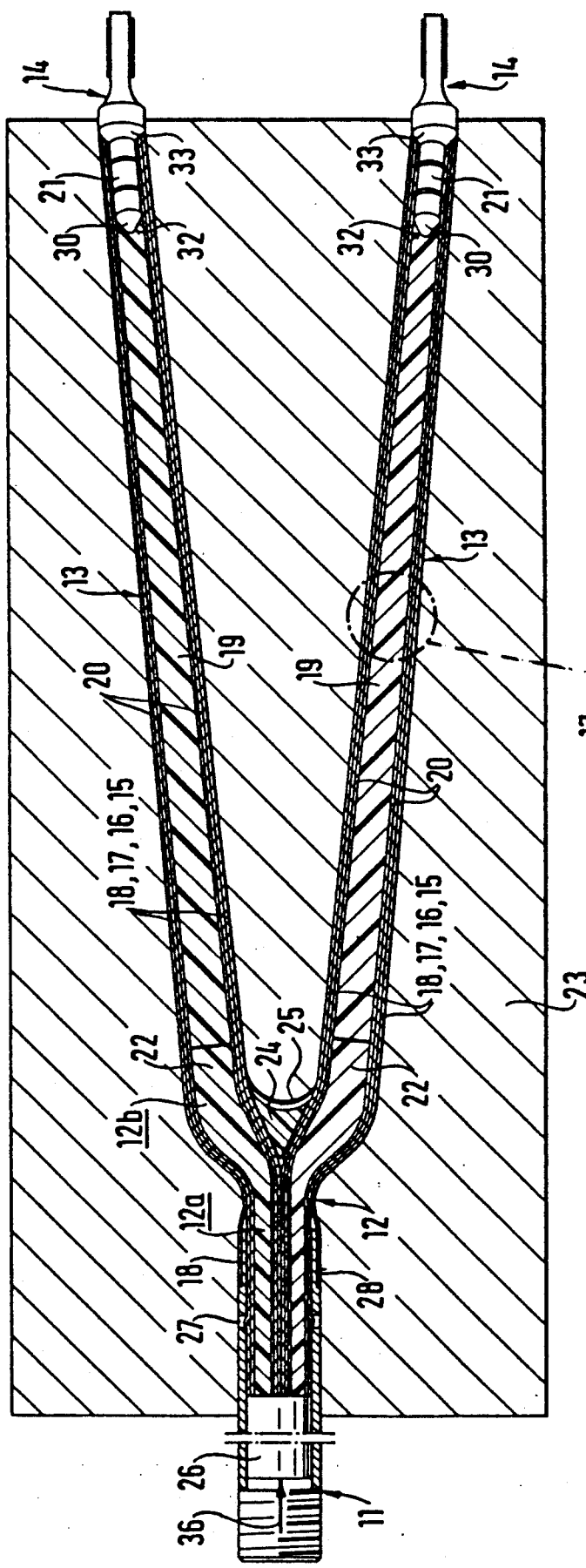
FIG. 1 a partially sectioned front view of a bicycle fork manufactured in accordance with the method of the invention.
Figure 1A:
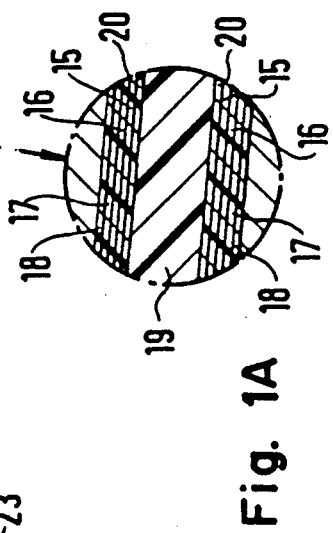
FIG. 1A is an expanded view of a portion of the bicycle fork.

In all figures, the same reference numerals designate components which functionally correspond to one another.

In accordance with FIG. 1, the bicycle fork of the invention has a tubular steering spigot 11 of circular cross-section which is later to be inserted into the non-illustrated steering bearing of a bicycle frame. The steering spigot connection part 12a of a fork head 12 having a shape complementary to the internal diameter of the steering spigot 11 is rotationally fixedly mounted in the lower region of the steering spigot 11. Two fork arm transition parts 12b branch off from the steering spigot connection part 12a in a downward direction and merge into the two fork arms 13. Connection spigots 21 of axle mounts 14 engage into the lower ends of the fork arms 13 and have an oval cross-section. The non-illustrated axle ends of an axle of a wheel are later inserted into the wheel axle mounting the slots 31 (FIG. 2) of the axle mounts 14.

Figure 6:
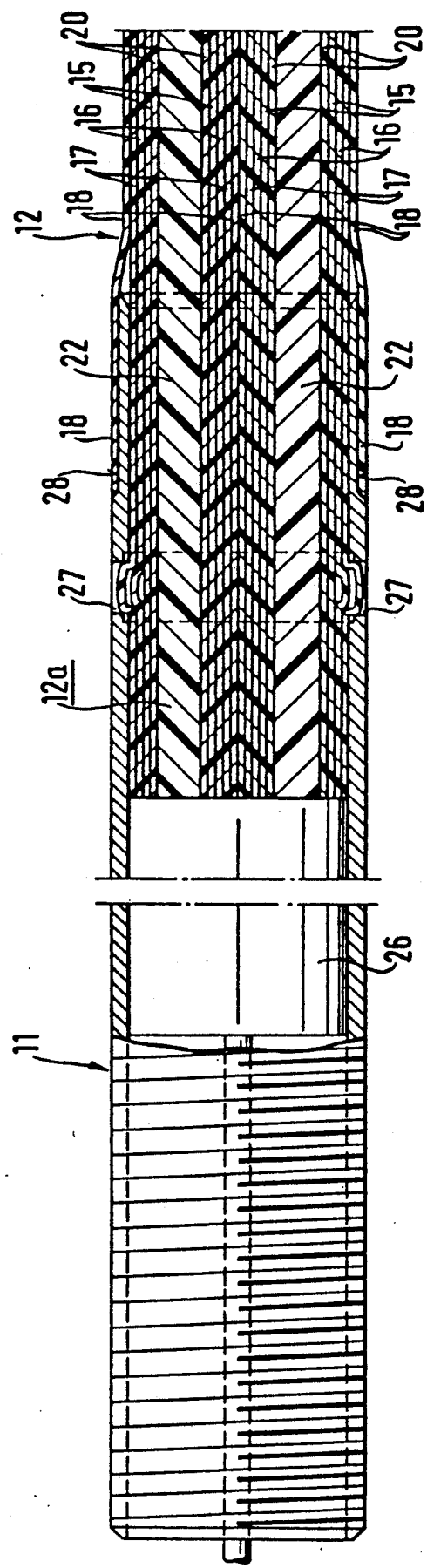

As seen in FIGS. 1, 1A 2 and 6 the fork arms 13 and the fork head 12 are built up as follows:

Hard foam cores 19 having approximately the same diameter as the connection spigots 21 are provided within the fork arms 13 adjoining the connection spigots 21 and respectively form a first component of a molding core. The hard foam cores 19 each have a recess 32 complementary to the rounded tip 30 of the respectively associated connection spigot 31 and border directly on the connection spigots 21 from where they extend up to the upper end of the practically straight part of the fork, where the fork arms 13 start to merge into the fork head 12. In this region a flexible foam core 22 having substantially the same cross-section and forming a second component of the molding core joins each of the elongate hard foam cores 19 and form a second component of the molding core. Each flexible foam core 22 extends via two oppositely disposed curves into the lower end of the steering spigot 11 (FIGS. 1, 6).

Around the cores 19, 22 and the connection spigots 21 there are laid several polymer impregnated sheaths which are essentially matched to the cross-sectional shape of the fork arms 13 and the fork head 12 and which consist of specific fiber or filament arrangements as follows:

A first foam material sheaths 20 comprises so-called syntactic foam. This is a resin filled with glass beads (spheres) which is initially flexible so that it can be brought into any desired curved shape but however hardens to a rigid plastic body after heating. The flexible foam material core 22 consists of the same material.

Around the flexible foam sheath 20 there is arranged a first polymer impregnated sheath 15 with a fiberous or filamentary mesh or fabric, with the angles of the filaments or fibers expediently lying between 30° and 90°. The angular bisector should extend in the direction of the axis of the fork head 12 or of the fork arms 13.

A radially outwardly adjoining sheath 16 (FIGS. 1, 2 and 6) consists preferably of fibers or filaments which extend parallel to the axis and to one another, with these fibers or filaments thus being laid in a ring arrangement around the sheath 15. A fabric with filaments or fibers arranged at 90° to one another can however basically also be used for the sheath 16, with the filaments or fibers however respectively extending parallel to the axis of the fork head 12 and of the fork arms 13, or at right angles thereto.

Yet further radially outwardly there is provided a sheath 17, which is likewise impregnated with polymer, and which again consists of a mesh or fabric of the same construction and arrangement as the sleeve 15.

Finally, an additional termination sleeve 18 can optionally be provided right of the outside around the above described arrangement, with the termination sleeve 18 either having filaments or fibers extending parallel to one another and to the axis or a fabric which is likewise polymer impregnated. All sheaths comprise the syntactic foam.

As seen in FIG. 1, a flexible foam crutch piece 24 is inserted into the crutch where the two fork arms 13 merge into the fork head 12 and comprises the same syntactic foam as the foam sheath 20 and the flexible foam core 22. Beneath the foam crutch piece 24 there is inserted a polymer impregnated saddle-like crutch sheath 25 as a reinforcement, with sheaths 25 expediently comprising a mesh or fabric of fibers or filaments impregnated with syntactic foam. The ends of the crutch sheath 25 are molded onto the outer sleeves 17 and 18 of the fork arms 13 and of the fork head 12 respectively.

In accordance with FIGS. 1 and 6 the steering spigot 11 has a peripheral recess 28 at the radially outer side of its lower region into which the outer sheath 18 of the fork head 12 is inserted. The remaining parts of the steering spigot connection parts 12a are accommodated within the lower end region of the steering spigot 11.

Above the recess 28 the steering spigot 11 has a concentric ring of through-going anchoring bores 27, still in the region of the steering spigot connection part 12a, and at least the outermost sleeve 17 located within the interior of the steering spigot 11 extends with the polymer impregnation into these bores.

Figure 2:
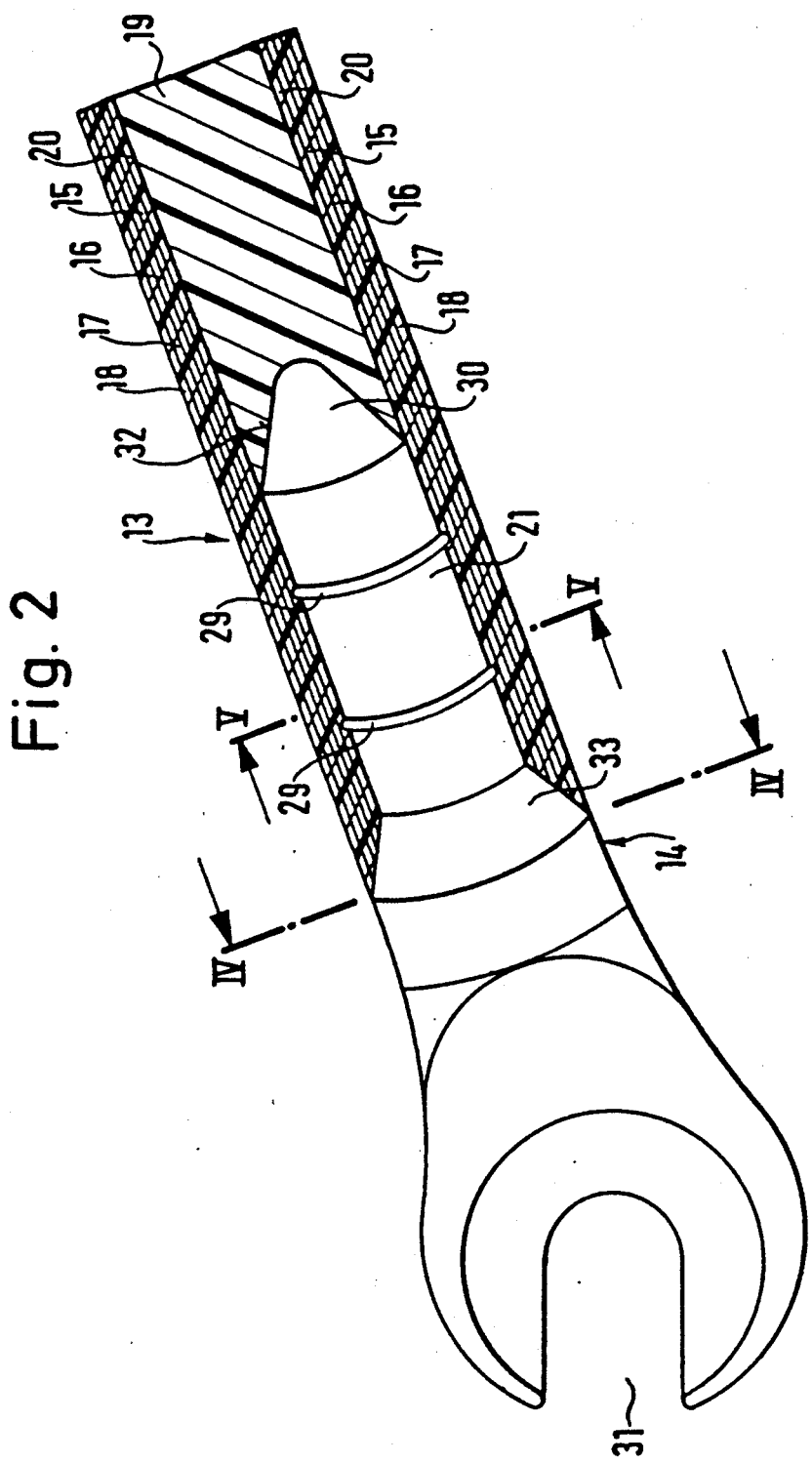
FIG. 2 a partially sectioned enlarged side view of an axle mount 14 of the bicycle fork of FIG. 1 with the adjoining regions of the associated fork arm 13, FIG. 3 a side view of the axle mount turned through 90° about the axis relative to FIG. 2, and without the adjoining parts of the associated fork arm, FIG. 4 a section on the line IV—IV in FIG. 2, FIG. 5 a section on the line V—V in FIG. 2, FIG. 6 an enlarged cross-section of the steering spigot 11 with the fork head 12 arranged thereon, and FIG. 7 a partially sectioned enlarged view analogous to FIG. 1 of a further embodiment of a bicycle fork manufactured in accordance with the method of the invention.
Figure 3:
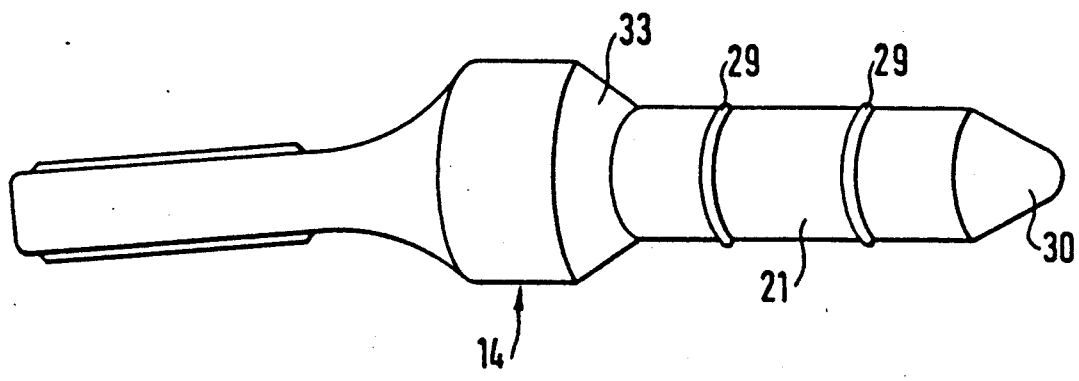

As seen in FIGS. 1, 2 and 3, the axle mounts 14 have a conically upwardly tapering peripheral step 33 at the transition from the part which projects out of the fork arms 13 to the connection spigot 21, and the connection spigot 21 adjoins this peripheral step. The connection spigot 21 is provided with ring-like peripheral ribs 29 which are finally followed by the rounded tip 30 (FIGS. 2 and 3).

Figure 4:
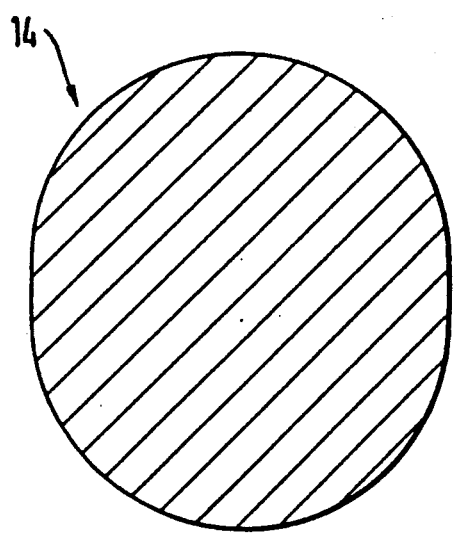
Figure 5:
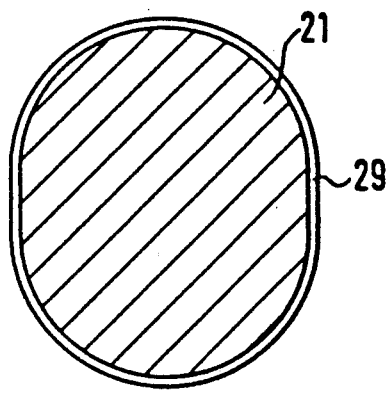

As seen in the cross-sectional views of FIGS. 4 and 5, the connection spigot 21 and the axle mounts 14 have an oval cross-section in the regions of the peripheral step 33 and ribs 29. The oval cross-section is in practice realized by two half-circles and short straight line connection pieces.

The polymer impregnation of the cores 19, 22 and also of the sleeves 15, 16, 17, 18 and 20 preferably consists of a polymer which is flexible and uncured for working purposes, and which is initially fluid on being heated and first solidifies following this heating.

The manufacture of the described bicycle fork proceeds as follows:

A manufactured blank is constructed in the following manner.

First of all two elongate structures which already determine the final length dimension of the fork are prepared from the hard foam cores 19 and from the flexible foam cores 22 and these are then completed at the lower end by the axle mounts 14. The sheaths 20, 15, 16, 17 and 18 are then simply wound around this basic arrangement.

At the upper end the two elongate structures are then brought together into the steering spigot connection part 12a and are introduced from below into the hollow steering spigot 11 up to a point which is clearly above the anchoring bores 27. During this procedure, the confronting portions of the outer sheaths or sleeves 18 come into contact with one another on the axis of the steering spigot 11 and indeed essentially along a plane which, in the middle, connects two half-cylinders. Prior to introducing the steering spigot connection part 12a into the steering spigot 11 the two outer sheaths 18 are each provided with two longitudinal slits and the respective outer portions of the outer sheaths 18 are pulled clear of the remainder of the connection part 12a. The outer portions of the outer sheaths 18 are subsequently drawn over the lower end of the steering spigot 11 and laid into the recess 28, i.e. after introduction of the steering spigot connection part 12a into the connection spigot 11. Finally the foam crutch piece 24 and the crutch sheath 25 are laid in whereby a manufactured blank is obtained.

The so-manufactured blank is then laid into the mold 23 which is matched to the final fork shape. The laying of the blank into the mold 23 can however also take place during the combination of the individual parts or sheaths.

After the blank has been laid into the mold 23 in the manner evident in FIG. 1 the mold is closed and a pressure piston 26 is introduced into the steering spigot 11 from the upper side, with the cross-section of the pressure piston 26 corresponding to the internal dimensions of the steering spigot 11.

A suitable pressure is then exerted onto the steering spigot connection part 12a from above in the direction of the arrow 36 (FIG. 1). A counterpressure is exerted by the mold 23 via the fork arms 13 and in particular via the crutch sheath 25. The mold 23 is then subsequently heated to a temperature of for example 120° to 160° whereupon the polymer impregnations which are provided in the cores 19, 22 and in the sheaths or sleeves 15, 16, 17, 18 or 20 are first of all soft, and in particular liquid, so that they can then fill out any hollow cavities which may still be present in the mold. The axial pressure which is exerted in particular by the pressure piston 26 contributes to this and leads moreover to the outer sleeve 17 with the impregnation resin which is located in the steering spigot 11 being partially pressed into the anchorage bores 27. The outer sleeve 18 is pressed by the mold 23 from the outside into the recess 28. Furthermore the various sheaths 20, 15-18 are pressed onto the connection spigot 21 and onto the peripheral step 33 of the axle mounts 14 by the mold.

After the plastic has filled out all the hollow cavities of the mold 23 as a result of the applied pressure the hardening process begins which is concluded after 1 to 2 hours.

The finished bicycle fork can now be removed from the mold 23. The metal and plastic parts are so firmly and in particular rotationally fixedly bonded together as a result of the described manufacturing process that the strength against release of the various parts is as good in practice as with a bicycle fork manufactured in one piece.

The bicycle fork of FIG. 7 is distinguished from the previously described embodiment in that two flexible core hoses 37 which are closed at both ends, which stand under internal pressure, and which pass from the connection spigots 21 (as shown in FIG. 1) to the upper end of the steering spigot 11, are provided as the forming core in place of the hard foam cores 19 and the subsequent flexible foam cores 22. As shown in FIG. 7A, the various sheaths 20, 15, 16, 17, 18 are then arranged around this forming core hoses 37. After the curing of the various sheaths 20, 15-18 the hose 37, which merely serves for the assembly, no longer has any function so that the escape of the inner pressure in the course of time is not disadvantageous. The load carrying forces are born exclusively by the sheaths 15, 16, 17, 18 and 20. The pressure within the hose 37 is however favourable during curing of the bicycle fork since it exerts a compressive force on the impregnating resin and contributes to the filling of hollow cavities.

Textile products which are impregnated with hardenable reaction resins are used to particular advantage for the fiber reinforced sheaths 15, 16, 17, 18. As reinforcement fibers one can consider glass fibers, aramid fibers, carbon fibers and graphite fibers and as polymer impregnation one can consider epoxy, polyimide, unsaturated polyester and phenolic resins. The finished sheaths should contain at least 60% by volume of fibers.

It is important that the mold 23 is heatable so that the components comprising the manufactured blank laid into the mold can be hot pressed. The curing process normally lasts between 0.5 and 2 hours. A several hour long post heat treatment is to be recommended. The hardening can if required also be carried out in an autoclave with corresponding sealing. A vacuum is expediently applied to the mold prior to the temperature increase in order to deaerate the mold. Finally, while the elevated temperature prevails the pressure in the autoclave is increased to for example 4 to 6 bar and indeed preferably for 1 to 2 hours.

We claim:

1. A method of manufacturing a bicycle fork comprising a tubular steering spigot of metal, a fiber reinforced polymer fork head rotationally fixedly connected to the steering spigot; two elongate polymer reinforced fiber fork arms formed in one piece with the fork head; first and second axle mounts of metal each disposed at a free end of a respective one of said fork arms remote from said fork head, said axle mounts each having a respective connection spigot inserted in rotationally fixed manner into the free end of the respectively associated fork arm; said method comprising the steps of:
  A. placing the connection spigots of the axle mounts at first ends of respective elongate molding cores which define the respective fork arms and which cooperate at second ends to define the fork head, said molding cores being flexible at least in the region of the fork head and extending up to an upper end of the fork head remote from said fork arms;
  B. laying a flexible foam sheath having a polymer impregnation around each connection spigot and the associated molding core;
  C. laying around each foam sheath a plurality of fiber reinforced sheaths comprising strength giving fibers having polymer impregnation with said fibers being disposed in selected orientations relative to the fork arms;
  D. combining the second ends of the sheathed molding cores into a single steering spigot connection part and at least substantially inserting in a mating fit into the lower end of the steering spigot, said lower end being positioned in use adjacent said fork arms thereby forming a blank;
  E. placing the blank into a heatable mold corresponding to the desired bicycle fork shape;
  F. heating the mold to a selected temperature at least sufficient to liquidify said impregnated polymer and maintaining said temperature until said polymer has hardened; and
  G. removing the bicycle fork from said mold.

2. The method of claim 1 further comprising:
  forming the mold core from a hard foam core and a polymer impregnated flexible foam core which directly adjoins the hard foam core at the top and is located in the fork head.

3. The method of claim 1 further comprising:
  providing a molding core formed by a core hose having an internal pressure and sealingly closed at its two ends.

4. The method of claim 1 further comprising:
  providing a polymer impregnated flexible foam material crutch piece inserted into the crutch formed by the merger of the two fork arms and providing a fiber reinforce saddle-like crutch sheath terminating at its margine substantially proximate to the fork arms and to the fork head respectively and applied onto the outermost sheath of the fork arms.

5. The method of claim 1 further comprising:
  applying pressure to the blank in the mold by means of a press piston pressing against the upper side of the steering spigot connection part from the open upper side of the steering spigot.

6. The method of claim 1 further comprising:
  laying the upper end of the outermost sheath around the outside of the lower end region of the steering spigot.

7. The method of claim 6 further comprising:
  providing a recess along the outside lower end of the steering spigot for receiving the outer sheath.

8. The method of claim 1 further comprising:
  providing preferably through-going bores in the lower region of the steering spigot distributed around the circumference;

whereby the sheaths are pressed at least partially into the bores prior to or during the heating steps.

9. The method of claim 6 further comprising: providing the bores as a ring of bores concentric to the axis of the steering spigot above the region where the outermost sheath is drawn at the outside over the steering spigot.

10. A method of manufacturing a bicycle fork comprising a tubular metal steering spigot having a plurality of bore holes, a fiber reinforced polymer fork head rotationally fixedly connected to the steering spigot; two fiber reinforced polymer impregnated fork arms joined with said fork head; first and second metal axle mounts each disposed at a free end of a respective one of said fork arms remote from said fork head, said method comprising the steps of:

A. forming a pair of fork arm molding cores each having a substantially straight elongated foam core along a lower portion and a flexible foam core along an upper portion;

B. inserting said axle mounts each having a non-round cross-sectional connection spigot and peripheral step, in a rotationally fixed manner into the lower end of each respectively associated fork arm molding cores;

C. laying a flexible polymer impregnated foam sheath around each connection spigot and respective fork arm molding cores;

D. laying around each foam sheath a plurality of polymer impregnated fiber sheaths, the orientation of said fibers of each sheath being selectively disposed relative to the fork arms thereby forming a pair of sheathed molding cores having an outer sheaths and a plurality of internal sheaths;

E. confronting the flexible upper portions of said sheathed molding cores to form a fork head having a single steering spigot connection part and a crutch where said two fork arms merge into said fork head;

F. inserting said steering spigot connection part at least substantially in a mating fit into a lower end of said steering spigot, the lower end being positioned in use adjacent said fork arms, thereby forming a manufactured blank;

G. placing said blank into a heatable mold;

H. heating said blank and mod to a temperature sufficient to liquify the polymer and simultaneously applying internal pressure to said blank whereby the portion of said sheaths forming said steering spigot connection part are pressably attached to said steering spigot and the lower portion of said sheaths are pressably attached onto said connection spigot and peripheral step of said axle mounts;

I. cooling said mold whereby said polymer is hardened; and

J. removing a high strength bicycle fork from said mold.

11. The method of claim 10 wherein the fork arm molding cores forming step is carried out using a hard foam core having a recess complementary to the connection spigot at said lower portion along the elongated axis of said cores.

12. The method of claim 10 wherein the step of forming a pair of fork arms molding cores comprises forming said molding core from a pair of flexible core hoses which are sealingly closed at its two ends and under internal pressure.

13. The method of claim 10 further comprising the step of inserting a polymer impregnated flexible foam crutch piece into the crutch, said crutch piece being covered by a polymer impregnated fiber reinforced saddle-like crutch sheath substantially overlapping said fork arms and said fork head whereby said crutch piece is pressably attached to said fork arms and fork head upon completion of steps (F)-(J).

14. The method of claim 10 wherein the step of applying internal pressure to said blank comprises inserting a pressure piston into the open upper portion of said steering spigot and exerting a suitable pressure on said blank whereby the liquified polymer will fill out cavities within the blank.

15. The method of claim 10 further comprising the step of providing at least two longitudinal slits to said outer sheath of each fork arm, separating said respective portion of said outer sheath from said internal sheaths and placing said portion over the outside and around the lower region of said steering spigot.

16. The method of claim 15 further comprising the step of providing said steering spigot with a recess proximate to the lower region for receiving the outer sheath.

17. The method of claim 10 further comprising the steps of providing anchoring bores distributed around the circumference in the lower region of said steering spigot for receiving portions of said internal sheaths forming said steering spigot connection part, whereby said internal sheaths are pressably forced at least partially into said anchoring bores during the molding process.

18. The method of claim 17 wherein said anchoring bores providing step further includes providing a ring of through-going anchoring bores concentric to the axis of the steering spigot above the region where the outermost sheath is drawn at the outside over the steering spigot.

* * * * *